(12) United States Patent
Boni et al.

(10) Patent No.: US 7,317,716 B1
(45) Date of Patent: Jan. 8, 2008

(54) METHODS AND SYSTEMS FOR PRESENCE-BASED TELEPHONY COMMUNICATIONS

(75) Inventors: Piotr Boni, Providence, RI (US); Michael A. Weintraub, Medfield, MA (US); Alex Tserkovny, Brookline, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1080 days.

(21) Appl. No.: 10/627,368

(22) Filed: Jul. 25, 2003

(51) Int. Cl.
*H04L 12/66* (2006.01)
*H04M 3/04* (2006.01)

(52) U.S. Cl. .................. 370/352; 370/260; 370/329; 370/401; 379/211.02

(58) Field of Classification Search ........ 370/216–266, 370/352–356, 349, 389, 392, 401, 465, 329; 379/211
See application file for complete search history.

(56) References Cited

U.S. PATENT DOCUMENTS 6,853,634 B1 * 2/2005 Davies et al. ............... 370/349

2003/0185232 A1 * 10/2003 Moore et al. ............... 370/465

* cited by examiner

Primary Examiner—Afsar Qureshi (57) ABSTRACT

A system and method can enable a user of a communications network, such as a Public Switched Telephone Network (PSTN), wireless and/or voice over IP network to participate in Presence Availability Management (PAM) and Instant Messaging (IM) activities of a PAM/IM network. In response to phone network triggers, a phone network Service Control Point (SCP) can generate requests to a web server. The web server can translate the requests to presence information that can be forwarded to presence user agents for participants of the PAM/IM network. The presence user agents can present the user's presence information to participants having the user on their "buddy list". In turn, the presence user agent for the user can forward the presence information for participants on the user's "buddy list" to a media server that can communicate the information to the user through Automatic Speech Recognition, Text to Speech and/or Dual Tone MultiFrequency technology.

46 Claims, 4 Drawing Sheets

METHODS AND SYSTEMS FOR PRESENCE-BASED TELEPHONY COMMUNICATIONS

FIELD

The systems and methods relate to communications networks, and more particularly to a system and method for adjusting a user's presence status based on the status of a telephone line.

BACKGROUND

Presence and Availability Management (PAM) tools are available in the art to provide and expose presence information to users of PC-based interfaces. As is known in the art, such tools are common in Instant Messaging (IM) systems and may be applied to a variety of devices and contexts, including email systems, Personal Digital Assistants (PDA's), text-based or graphical/visual displays offered in cellular phones and Session Initiation Protocol (SIP) or other Voice Over Internet (VoIP) Phones.

The above applications generally include a text display to indicate presence and status information for members of a "buddy list" selected by the user. Typically, PAM users monitor the presence of other individuals, usually called "buddies". The collection of buddies is usually called a buddy list. To date, audio only devices, such as traditional Public Switched Telephone Network (PSTN) telephones, have not provided presence information directly to users. While one's presence may be inferred from some telephones that can visually show the state of one or more telephone lines, typically, a PSTN user does not receive presence information until an attempt is made to place a call. The caller may then hear ringing, a busy signal, or a message intercepting the call; each alternative provides some evidence as to the called party's availability. As attested to by the popularity of IM services, it is desirable to provide presence and availability information to a PSTN user for members of a buddy list.

SUMMARY

A method can enable a user of a communications network, such as a Public Switched Telephone Network (PSTN) to participate in Presence Availability Management (PAM) and Instant Messaging (IM) activities. The method can provide the user with presence-based status information for members of a buddy list of the user. The method can comprise generating a signal signifying a status of a communications network device of the user, transferring the signal to a web server, translating the signal to presence-based information for the device, propagating the presence-based information to presence user agents associated with participants of the presence-based network, obtaining, at one of the presence user agents associated with the user, presence-based information for selected participants of the presence-based network, forwarding the presence-based information for the selected participants to a media server of the communications network and communicating the presence-based information for the selected participants to the user in a communications network compatible format.

To communicate the presence-based information for the selected participants, the method can include initiating a call from the media server to the user, when the presence-based information for one of the selected participants indicates a status change in the selected participant's device, and presenting, in the communications network compatible format, the presence-based information for the selected participant to the user when the user accepts the call. In one embodiment, communicating the presence-based information for the selected participants can include presenting, in the communications network compatible format, a listing of the selected participants and the corresponding presence-based information for the selected participants, when the user selects an option to receive the presence-based information. A text-to-speech translation can be applied to communicate the presence-based information to the user.

The method can include transmitting messages between the user and the selected participants. Messages from the selected participants to the user can be forwarded to the media server and translated to a communications network compatible format. A call can be initiated to the user and the communications network compatible message can be presented to the user, when the user accepts the call. The communications network compatible messages can be queued for later communication when the user does not accept the call.

When the user selects an option to receive queued messages, a listing of the selected participants can be presented to the user, which can include a queued message indication for the selected participants having messages not delivered to the user. The user can choose to receive messages from the listing. In one embodiment, the queued messages can be presented sequentially to the user.

For transmitting messages from the user to the selected participants, the method can include communicating a communications network compatible message from the user to the media server, translating the communications network compatible message to a web-based request referencing the communications network compatible message, creating a presence-based network message from the web-based request and sending the presence-based network message to presence user agents associated with the selected participants. The communications network compatible message can be an audio message and the presence-based network message can identify a web site for playing the audio message.

The user can provide a login sequence to connect the user to the presence-based network and a signal can be generated that can signify an on-line status for the user's device. A signal signifying a busy status for the user's device can be generated when the user initiates an action chosen from a menu including getting status, receiving messages, sending messages, making a call on the communications network and receiving a call on the communications network. A signal signifying an off-line status can be generated when the user performs a logout. A signal signifying one of an away status or an off-line status, as chosen by the user, can be generated when a predetermined amount of time elapses after the user performs a hang-up action.

Generating a signal to the web server can include sending a trigger from a service switching point of the communications network to a service control point of the communications network, the trigger based on a user action with respect to the user's device, and generating a hypertext transfer protocol request and/or a transmission capabilities application part message. The trigger can result in creation of the presence-based status information message. Forwarding the presence-based information to the presence user agents can include forwarding the presence-based information to the presence user agent associated with the user, modifying a presence status of the presence user agent associated with the user, communicating the modified presence status to a presence server and propagating the modified status from the presence server to the presence user agents associated with participants of the presence-based network.

A system for enabling a user of a communications network to participate in Presence Availability Management (PAM) and Instant Messaging (IM) activities can include a service control point that can receive status triggers for participant devices connected to the communications network, a web server receiving status signals from the service control point and translating the status signals to presence-based information for respective participant devices connected to the communications network and presence user agents associated with participant in the presence-based network. Each presence user agent can receive the presence-based information for a respective participant device and can modify its presence status to correspond with the received presence-based information. The system can also include a presence server that can receive notifications of modified presence statuses for the respective participant devices and can propagate the notifications to presence user agents of buddy list participants for the respective participant devices so as to communicate the notifications to the buddy lists participants. The system can further include a media server to receive the notifications for buddy list participants having participant devices connected to the communications network and to communicate the notifications through the participant devices connected to the communications network.

The media server can include a speech recognition module, a text to speech module that can facilitate communication of instant messages between the buddy list participants and a media server user agent that can facilitate communications between the presence server and the media server. The system can include a persisted message database for storing instant messages when communication of the instant messages is not completed.

The system can include a notification engine that can receive notifications and alerts from sources outside the presence-based network and can propagate the notifications and alerts through the presence-based network via communication with the web server. An alerting service user agent can facilitate communication between the notification engine and the presence user agents. The system can include one or more databases containing participant information and can include an application server to facilitate communication between the web server and the databases. The application server can include a trigger processor to facilitate communication between the service control point and the web server when the status signal is a transmission control protocol/internet protocol transmission capabilities application part message.

In one embodiment, a computer program, disposed on a computer readable medium, can enable a user of a communications network to participate in a presence-based network. The computer program can include instructions for causing a processor to generate a signal signifying a status of a communications network device of the user, transfer the signal to a web server, translate the signal to presence-based information for the device, forward the presence-based information to presence user agents associated with participants of the presence-based network, obtain, at one of the presence user agents associated with the user, presence-based information for selected participants of the presence-based network, forward the presence-based information for the selected participants to a media server of the communications network, and communicate the presence-based information for the selected participants to the user in a communications network compatible format.

The computer program can include instructions for causing a processor to present, in the communications network compatible format, a listing of the selected participants and the corresponding presence-based information for the selected participants when the user selects an option to receive the presence-based information. The instructions for causing a processor to communicate the presence-based information for the selected participants can include instructions for causing a processor to initiate a call from the media server to the user and await answering the call by the user to present the listing.

The computer program can include instructions for causing a processor to transmit messages from one of the selected participants to the user by forwarding the message to the media server, translating the message to a communications network compatible message, initiating a call to the user, presenting the communications network compatible message to the user when the user accepts the call, and queuing the communications network compatible message when the user does not accept the call. The instruction for causing a processor to communicate the presence-based information for the selected participants can include instructions for causing a processor to present a listing of the selected participants to the user when the user selects an option to receive queued messages, the listing including a queued message indication for the selected participants having messages not delivered to the user, and present selected queued messages to the user. The computer program can present the queued messages sequentially to the user when the user selects an option to receive queued messages.

The computer program can communicate a communications network compatible message from the user to the media server, translate the communications network compatible message to a web-based request referencing the communications network compatible message, create a presence-based network message from the web-based request, and send the presence-based network message to presence user agents associated with the selected participants. The computer program can include instructions for causing a processor to identify a web site for playing the communications network compatible message when the communications network compatible message is an audio message, and instructions to apply a text-to-speech translation to the presence-based information.

The computer program can include instructions for causing a processor to present to the user a menu of actions including getting status, receiving messages, sending messages, making a call on the communications network and receiving a call on the communications network, generate a signal signifying a busy status for the user's device when the user initiates at least one action chosen from the menu, generate a signal signifying an off-line status for the user's device when the user performs a logout from the computer program, and generate, when a predetermined amount of time elapses after the user performs a hang-up, a signal signifying a status for the user's device chosen by the user from a listing including an away status and an off-line status.

The instructions to generate a signal can include instructions for causing a processor to send a trigger from a service switching point of the communications network to a service control point of the communications network, the trigger based on a user action with respect to the user's device, and generate a hypertext transfer protocol request and/or a transmission capabilities application part message. The instructions for controlling a computer to propagate the presence-based information to the presence user agents can include instructions for controlling a computer to propagate the presence-based information to the presence user agent associated with the user, modify a presence status of the presence user agent associated with the user, communicate the modified presence status to a presence server, and propagate the modified status from the presence server to the presence user agents associated with participants of the presence-based network.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
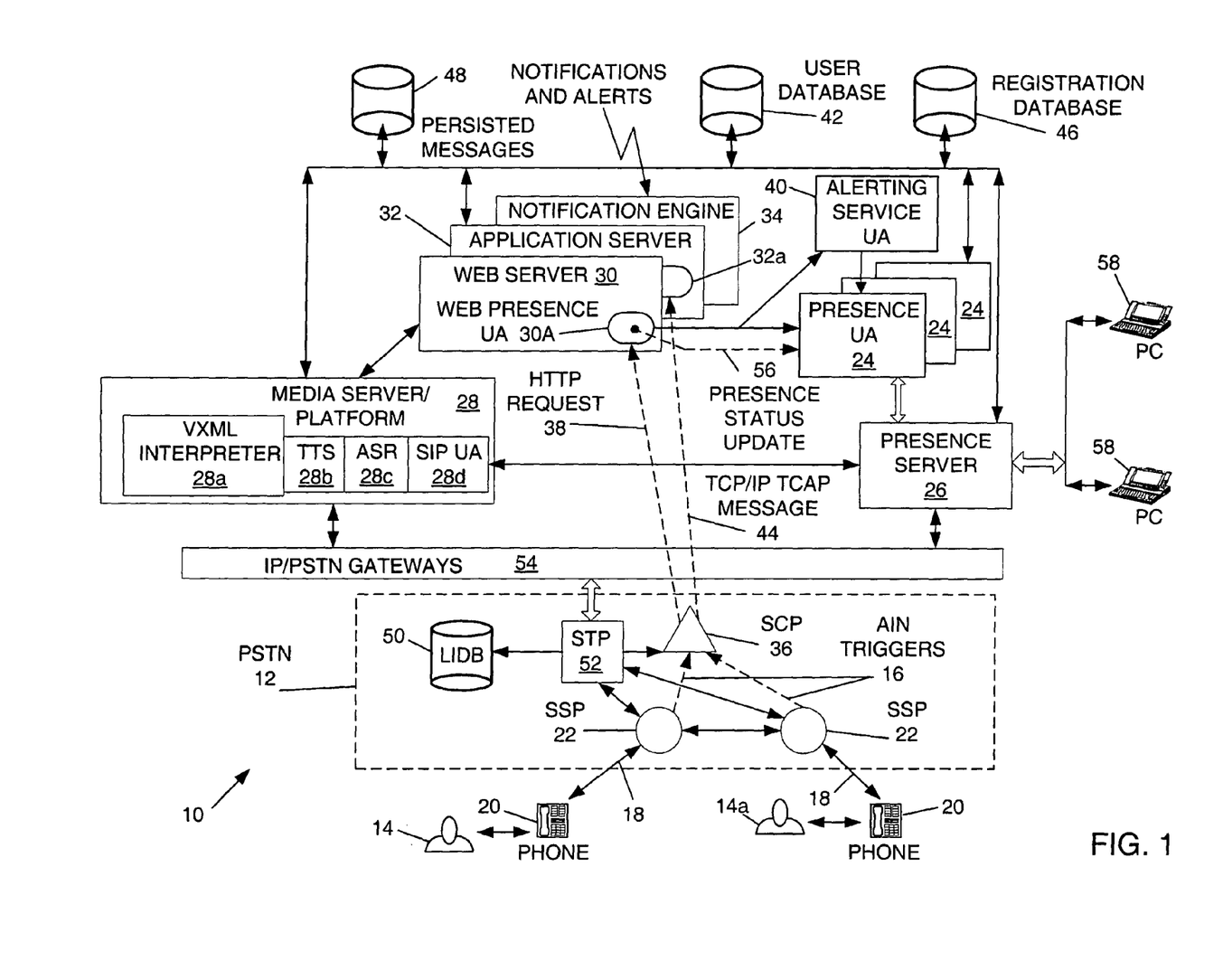
FIG. 1 shows a system for presence-based telephony in a PSTN.

Referring to FIG. 1, there is illustrated a schematic representation of a system 10 that can provide for presence-based telephony in a PSTN 12. The system 10 can provide a PSTN user 14 with the functionality of PAM and IM systems, including services for sending and receiving instant voice or text messages, making and receiving telephone calls and receiving voice alerts and notifications. These services can be executed in the context of a user's presence status and the presence status presented by each member of the user's buddy list. A user's presence status changes in response to notifications delivered to the system via signals in PSTN 12, as illustrated by dashed lines 16, including Advanced Intelligent Network (AIN) triggers.

The triggers 16 can modify presence status in real-time, according to the status of the telephone lines 18 between phones 20, or other voice devices, and Service Switching Points (SSP's) 22 of PSTN 12, through which a user 14 may interface with PSTN 12. PSTN 12 can be interfaced with one or more presence User Agents (UA's) 24, as will be described further. The presence UA's 24 can receive and process PSTN trigger notifications, instant messages and other alerts and notifications using known protocols, including Session Initiation Protocol (SIP) and IM or SIP, IM and Presence Leveraging Extension (SIMPLE), implemented on presence server 26. A presence UA 24 can modify and/or update its presence status as a result of the alerts, notifications and messages it receives.

It is noted, however, that presence server 26 and system 10 do not depend on SIMPLE or other specific VoIP or IM protocols. Such protocols are presented for exemplary purposes in describing the system 10 and components thereof. Presence server 26 can be a network-based set of modules enabling real-time communication sessions between users, as may be known in the art. These communication sessions can support a variety of communication services, including instant messaging, voice communications, video communications and/or application sharing. In addition, it can be understood that PSTN 12 provides an exemplary embodiment for the methods and systems described herein and that other communications networks, such as wireless networks, and VoIP networks can be adapted to fully participate in the instant voice and text messaging, alerts and notifications, and status update services described herein and that other devices, such as mobile phones, PDA's and the like for use with such systems can be so adapted.

Referring back to the exemplary embodiment of FIG. 1, media server 28 can manage the interaction between system 10 and user 14 and can provide the capability to play prompts and recognize responses, e.g., Dual Tone MultiFrequency (DTMF) tones and/or spoken commands. Media server 28 may include known components, e.g., a Voice extensible Markup Language (VXML) interpreter 28a, Text To Speech (TTS) module 28b and Automatic Speech Recognition (ASR) module 28c, which can provide the desired interaction management, prompting and recognition capabilities. Media server 28 can interact with web server 30 and application server 32 to pass configuration, registration and other types of requests, e.g., sending instant messages and/or initiating telephone calls. Media server 28 can also record audio messages that can be sent as instant voice messages.

Web server 30 can serve as an intermediary for other components of system 10. For example, it can pass requests between the media server 28 and application server 32, notification engine 34 and/or presence UA's 24. As may be known in the art, web server 30 can receive HTTP-based notifications or requests, either directly or indirectly, from a Service Control Point (SCP) 36 of PSTN 12, as indicated, for example, by dashed arrow 38 in FIG. 1. The notifications can result from AIN triggers 16 delivered to SCP 36 by SSP 22 of PSTN 12. Web server 30 can translate incoming HTTP requests 38 from different entities, such as Voice XML script from media server 28 and/or notification engine 34 software, to SIP and IM (or SIMPLE) messages, passing them to the web presence UA component 30a of web server 30. Web presence UA 30a can communicate with and can control presence UA's 24 and alerting service UA 40.

Application server 32 can process requests from the web server 30 and can also send web server 30 new requests. Application server 32 can communicate with media server 28 and/or presence server 26. In addition, application server 32 can communicate with user database 42 for provisioning and configuration purposes and can include PSTN trigger notification processor 32a. As may be known in the art, PSTN trigger notification processor 32a can receive notifications from the SCP 36 for Transmission Control Protocol/Internet Protocol (TCP/IP) Transmission Capabilities Application Part (TCAP) messages, as indicated by dashed arrow 44. Notification engine 34 can receive notifications and alerts from different sources and propagate the notifications and alerts through the system via communication with web server 30. Notification engine 34 can be a Simple Mail Transfer Protocol (SMTP)-based module, as may be known in the art, which can deliver notifications and alerts to a user presence device, i.e., the device used by the user for which user presence information can be obtained.

System 10 can persist, e.g., store, data in a data store, which may include such storage devices as a relational database, Lightweight Directory Access Protocol (LDAP) directory and/or other file system. The persisted or stored data can include user or subscriber provisioning and configuration data, e.g., user preferences and/or user profiles in user database 42; user registration data, e.g., user SIP or SIMPLE registration and contact information in registration database 46; and voice messages, e.g., persisted instant voice messages in data store 48.

The UA's, e.g., the presence UA's 24, the alerting service UA 40 and the web presence UA 30a, can act as proxies for a user and can represent intermediate points for communications. For the exemplary system of FIG. 1, SIP UA 28d can serve as an intermediary between presence server 26 and media server 28. The UA's can include applications that can initiate a request, such as a SIP request, on behalf of the user, that can contact the user when a request, such as a SIP request, is received and that can return a response on behalf of the user. The response can include accepting, rejecting, and/or redirecting the request. Presence UA 24 can represent user 14 and can act on behalf of user 14 when user 14 has logged into system 10, e.g., via telephone 20. It can be understood that the representation of user 14 by presence UA 24 need not be limited to telephone 20, but may include devices or applications through which a user may communicate with system 10, e.g., an internet browser.

Presence UA 24 can receive and interpret IM messages in XML format from web presence UA 30a. The XML data can specify the sender and recipient information. The presence UA 24 for the sender can create a new IM message in text format and can send it to a recipient. The text can be taken from the content element of the received XML-based IM message. If the recipient is, for example, a PC-based user, then the recipient can receive an IM message containing the Uniform Resource Locator (URL) for playing the audio content recorded by the sender. When UA 24 for user 14 (or for other users having a voice device) receives an IM message containing the URL to an audio file recorded by the sender, UA 24 can invoke media platform 28 to make an outbound phone call to user 14. During the call, the URL to the audio file recorded by the sender can be resolved by media platform 28 and an instant voice message can be played to the user 14 (or other recipient having a voice device). When an IM message is received in text format, UA 24 can invoke media platform 28 to make an outbound phone call during which the message content is read to the recipient by TTS 28b.

Web presence UA 30a can act as a gateway between Internet/Intranet requests, e.g. HTTP or Simple Object Access Protocol (SOAP) requests, and the system 10 infrastructure, e.g. the SIP and IM (or SIMPLE) infrastructure. The alerting service UA 40 can act as an intermediary between the notification engine 34 and the user 14. The alerting service UA 40 can deliver a diverse set of public and/or private alerts and notifications regardless of type of device used. The manner of operation of alerting service UA 40 on alerts and notifications can be similar to the operation of UA 24 on IM messages, as described previously.

In addition to the previously described components, system 10 may include components known in the art to comprise telephony networks with AIN capabilities, such as PSTN 12. Such components can include telephone switches, e.g., SSP 22, Line Information Database (LIDB) 50, control points and transfer points, e.g., SCP 36 and Signaling Transfer Point (STP) 52. While processing a call, SSP 22 may obtain AIN information from LIDB 50 via STP 52. SSP 22 may generate a trigger 16 that can initiate a TCAP query to SCP 36. The service logic of SCP 36 can process the query and may send an HTTP request and/or another TCAP query into the IP domain via IP/PSTN Gateways 54. The requests and/or queries can be received by web server 30 and/or the PSTN trigger notification processor 32a.

Figure 2A:
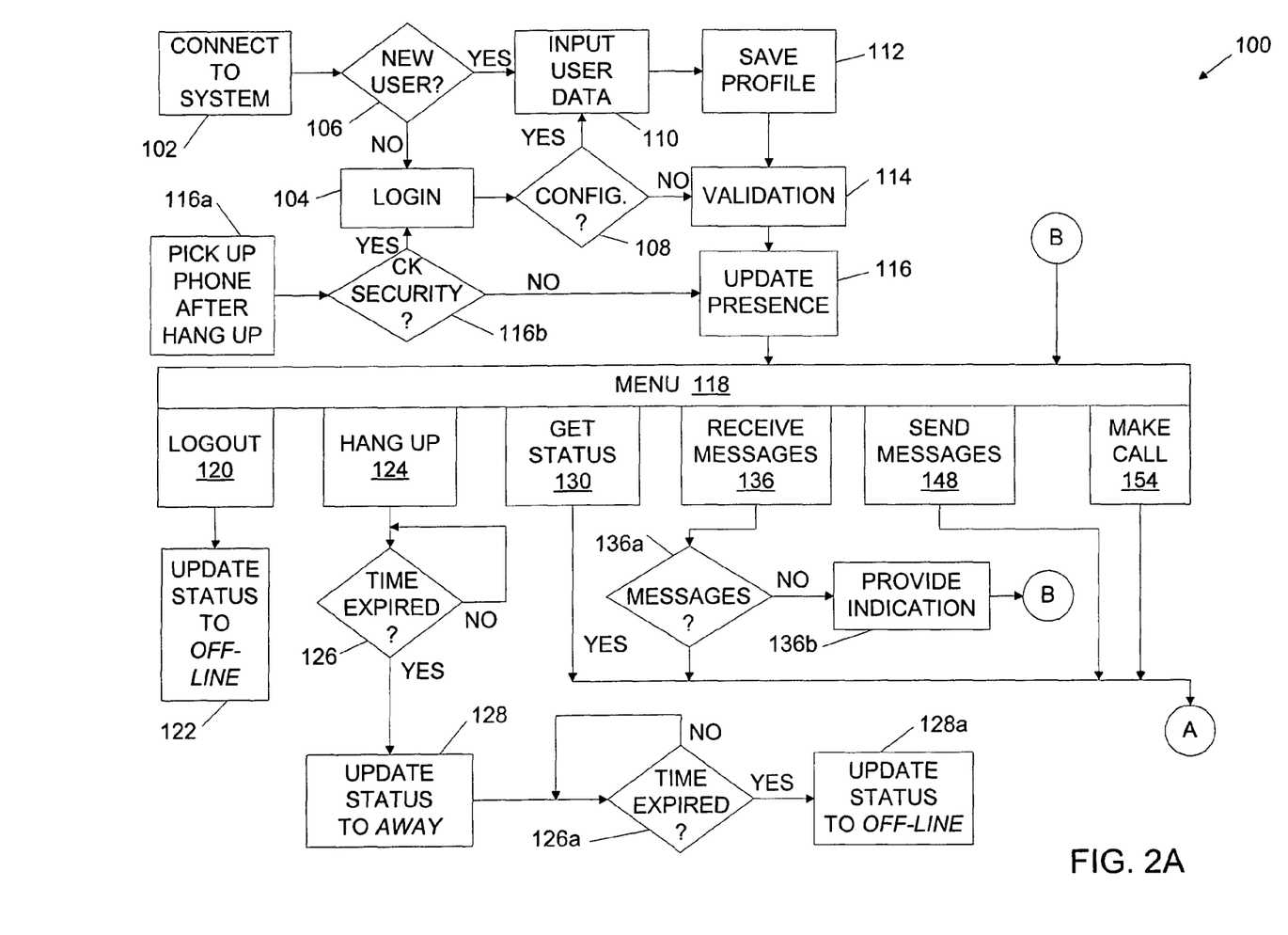
FIGS. 2A and 2B illustrate a method of implementing presence-based telephony in a PSTN.
Figure 2B:
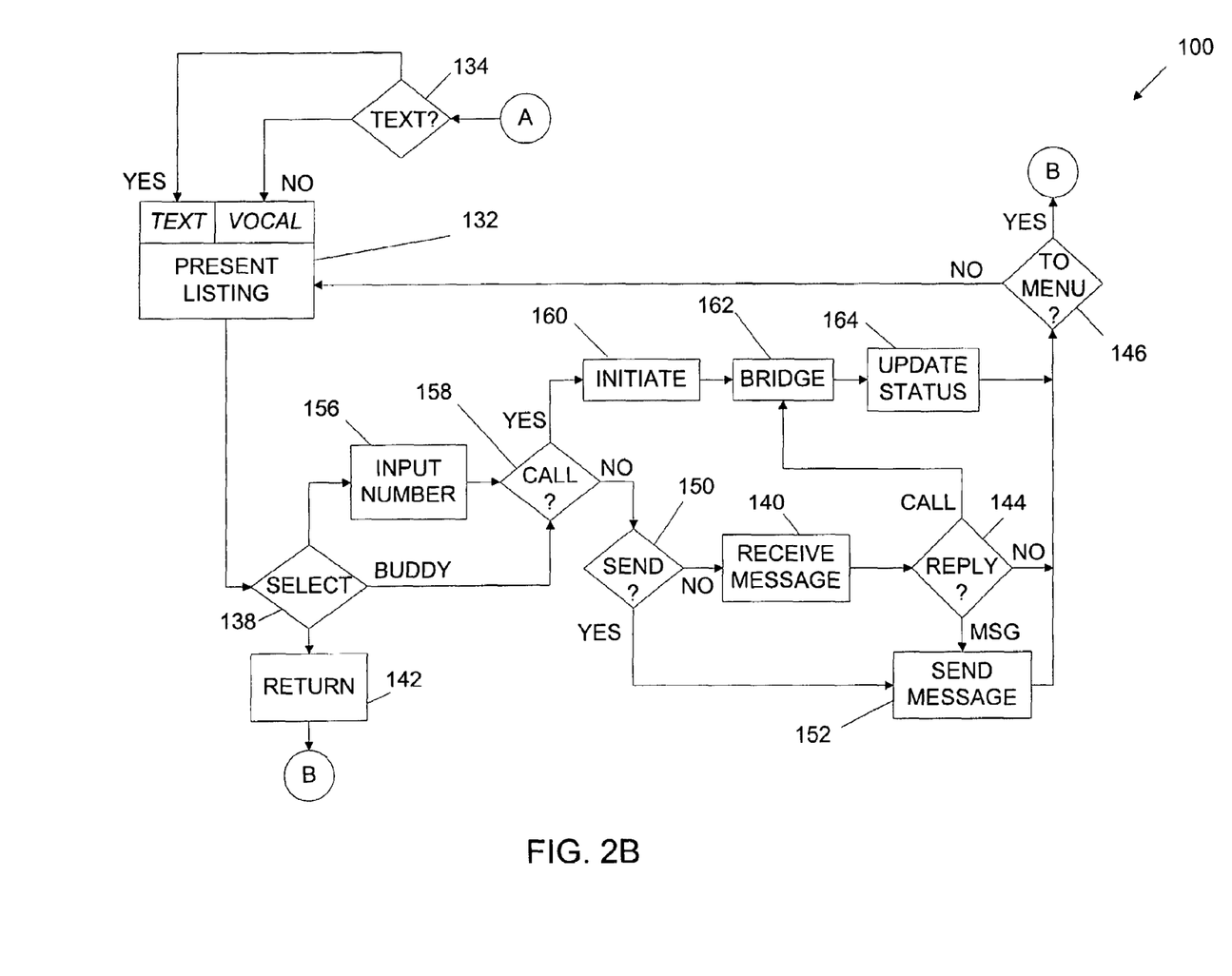

Referring now to FIGS. 2A and 2B, there is shown a flow chart of a method 100 that illustrates the operation of system 10. The operation is described from the perspective of PSTN user 14. However, it can be understood by those of skill in the art that the descriptions herein can apply to other users of system 10, including cellular phone users, VoIP users, PDA users and/or other communications network device users.

A user can first connect (102) to media server 28. For user 14, connection to media server 28 is made, via phone 20, SSP 22, STP 52 and gateway 54, by dialing the access telephone number for system 10. Existing users may then be prompted to login at 104. If user 14 is a first time user, as determined at 106, or if user 14 wishes to change previous configurations after logging in, as determined at 108, media server 28 can prompt user 14 to input user data (110), from which system 10 can create and save a user profile and a user account (112). The user data may include an assigned or selected sign-in name, an email address, a SIP Uniform Resource Identifier (URI) address, a password, a pin, user selected preferences, user selected system settings and/or other data that system 10 can save and/or store to identify user 14. It can be noted that the sign-in name, password, pin and/or other user data can be used for user login at 104.

The input data may also include a nickname that can identify the user 14 to other system users, as may be known for creating buddy lists. User 14 can also provide a listing of other users that can serve as the buddy list of user 14. The system 10 can save the user's identity, profile, service settings and other user input data in the data store, e.g., in user database 42. Once existing user 14 has logged in at 104, or new user 14 has input the appropriate data at 110, the login and/or user data can be validated at 114 such that the user 14 can gain access to the system 10. The user data can be validated against the data in the user database 42 and/or the registration database 46.

Different forms of presence availability or presence status are known in the art, including off-line, on-line, busy (or on-the-phone) and away. For simplicity and illustrative purposes, the following description will be based on the foregoing. However, it can be understood that the method and system herein described may not be limited to this simple set of presence statuses. Once validated, user 14 presence status may be determined and updated automatically, as indicated at 116, using signaling by PSTN 12. This action (116) can result in presence server 26 updating or propagating the presence status of the user 14 on the buddy lists of other users that include user 14 on their lists. An existing user 14 may adjust user presence status manually. When user 14 chooses to change configuration data at 110, the data can include setting the presence status for the user. However, unless specifically changed during user input at 110, the updated presence status for the user 14 can be the presence status as determined automatically at 116.

When not logged-in, user 14 presence status can be set to off-line. After login and validation, user 14 presence status can typically be set to on-line. System 10 can monitor activity of user 14 through presence UA 24 for user 14 and can propagate presence status changes for user 14 to other users who may have user 14 on their buddy lists. A predetermined period of inactivity can result in changing the on-line presence status to away. If user 14 picks up phone 20, the away presence status can return to on-line, e.g., by way of an AIN off-hook immediate trigger 16, as may be known in the art.

Figure 3:
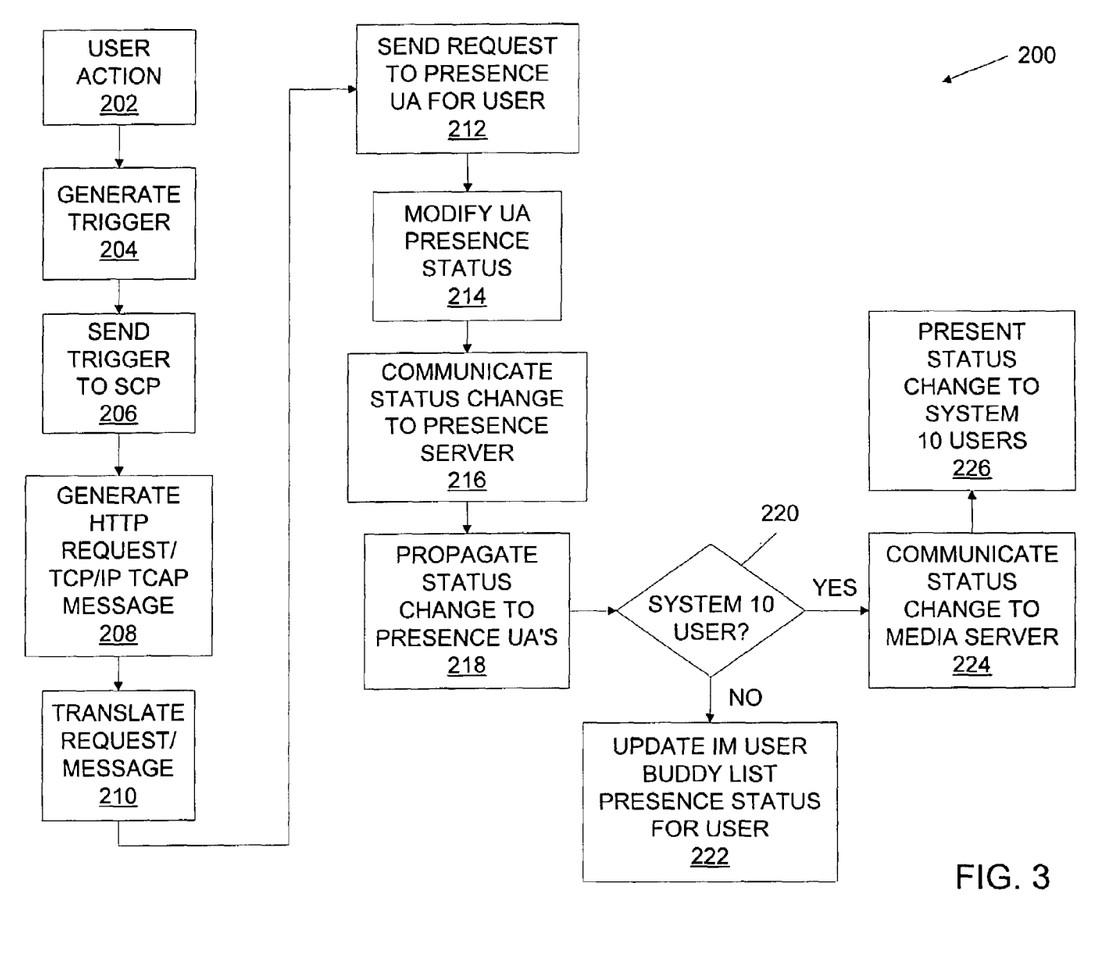
FIG. 3 illustrates a method of propagating a status change notification through the system of FIG. 1.

Generally, when user 14 initiates a telephone call, SSP 22 can generate an AIN O_Connect trigger 16, or other similar trigger, to signify a telephone line status change. The status change notification can be propagated through the system 10, as shown in FIG. 1, with the presence status of user 14 changed to busy. Similarly, when the telephone call ends, an AIN O_Disconnect trigger 16, or other similar trigger, can be generated and propagated, resulting in a presence status change of user 14 from busy to on-line. It can be seen that AIN trigger 16 need not be limited to the triggers described above, but can include other triggers that can signify status changes. FIG. 3 shows an illustrative flow chart for a method of propagating the status change notification through system 10.

Referring now to FIG. 3, method 200 can be initiated when an action by user 14 (202) results in the generation of an AIN trigger 16, as at 204 and as described above. Actions 202 can include picking up and/or replacing the receiver of phone, or device, 20, initiating a phone call, ending a phone call, receiving a phone call, and/or performing an action associated with the operation of system 10, as may be described for method 100, herein. AIN trigger 16 is sent to SCP 36 (206), which can generate an HTTP request 38 to web server 30 (208). Web server 30 can translate, or map, the HTTP request (210) to the appropriate presence status and pass the translated request to the presence UA 24 for the user 14 via the web presence UA 30a of web server 30 (212). UA 24 can modify its presence status (214) accordingly. Depending on the feature set of SCP 36, the SCP 36 may generate a TCP/IP TCAP message 44 to application server UA 32a, which can send the appropriate request to web server 30 (not shown).

Presence UA 24 for user 14 can communicate the status change to presence server 26 (216), which can propagate (218) the presence status change of user 14 to other presence UA's for users who have user 14 on their buddy list. For users having traditional IM services, as determined by presence server 26 at 220, presence server 26 can update (222) the presence status for user 14 at the user's device, e.g., PC 58, as is known in the art. For other users of system 10, such as user 14a, presence server 26 can provide (224) the updated presence status for user 14 to media server 28 for presentation (226) to user 14a. In one embodiment, as described further in relation to FIGS. 2A and 2B, media server 28 can deliver an instant voice message alert about the status change to user 14a.

For the illustrative embodiment of FIGS. 2A and 2B, user 14 presence status of busy can indicate telephone activity. With regards to descriptions of actions related to buddy lists, the presence status for a member of the buddy list can be taken as on-line, unless stated otherwise. It can be understood that telephone activity may be represented by other presence status indications. For example, user 14 presence status may be set to busy during telephone conversations, but user 14 presence status can remain on-line during telephone activity for engaging with instant voice message delivery or during the provisioning and configuration activity with media server 28. While AIN triggers 16 from these activities can result in presence status update requests (indicated by dashed line 56 in FIG. 1), these update requests can be ignored by presence UA 24 when the activity is related to system 10 and not to a phone conversation. Thus, the user 14 presence status can remain unchanged, i.e., can remain on-line, during such activity.

When presence status is maintained as on-line during system 10 related activities, delivery of incoming telephone calls and/or instant messages during the activity may be necessary as the calling or messaging party has been given an indication that the called party (the user 14) is available (on-line). Delivery of multiple instant voice messages within one telephone call can be assured by the use of a queuing mechanism for instant voice message delivery in presence UA 24 and by dynamic notification of the arrival of new instant messages while in the call, for example, through notification engine 34. It can be understood by those of skill in the art that a call waiting function can be operable such that the user 14 can receive notification of incoming calls.

Other presence status indications and/or changes can also be contemplated. For example, a call screening service, as may be known in the art as Selective Inbound Call Filtering, can selectively apply a user 14 presence status of off-line to the buddy lists of others, even though this user may actually be on-line. In another example, a call can be automatically scheduled depending on presence status. A user can request that system 10 set up a telephone call to a designated off-line user when the designated user's presence status changes to an on-line indication. The connection can be expanded to implement ad-hoc conferences when multiple designated users come on-line.

Referring more particularly to FIGS. 2A and 2B, once the user 14 is admitted to system 10, a selectable menu of actions can be presented to the user at 118. The menu can include selections to log out (off-line), hang up and remain on-line, get presence status of buddy list members, send/receive messages and make telephone calls. If the user 14 chooses to logout (120), presence status for user 14 will be updated to off-line (122). The user 14 can signal a logout action using DTMF or speech commands. Media server 28 can send a LOGOUT message to the web presence UA 30a via web server 30. Web presence UA 30a can send an IM message about the logout action to presence UA 24 of user 14. Presence UA 24 can then deregister with presence server 26 and exit. The presence server 26 can propagate the off-line presence status of the user to other users. The user 14 can subsequently re-connect to the system 10 by returning to 102.

If the user 14 wishes to hang up yet remain connected to system 10, the user may choose to hang up (124). The presence status for user 14 can remain on-line for a predetermined time. After this time, as determined at 126, the presence status can be updated to away (128). In one embodiment, the user 14 can select an additional predetermined amount of time after which the presence status can be updated to off-line, as indicated at 126a and 128a. If the respective predetermined times do not elapse, the presence status can remain on-line or away, respectively, until some action by user 14 or some operation of system 10, such as an incoming call or message, can update the presence status.

It can be understood that the user 14 need not "choose" the item 124 from the menu 118. The act of hanging up the phone 20 when connected to the system 10 can trigger the hang up operation 124. For example, a user 14 connected to system 10 may hang up the phone 20 when a call is completed, or when validation (114) and updating of presence (116) are completed. It can also be understood that the predetermined times can be set such that the user 14 presence status can remain on-line or away for extended periods of time, e.g., the predetermined time before the status is updated to away or to off-line can be set to a long period of time such that, for practical purposes, the predetermined time will not elapse. The predetermined time can be set by user 14 during configuration (110), with a default value specified by the system 10, or the predetermined time can be set by system 10.

In one embodiment, after choosing menu item 124, the user 14 can be returned to 116 upon subsequently picking up the phone, as may be indicated at 116a. In this embodiment of method 100, the user can avoid a new login sequence. However, when increased security is desired, as can be determined at 116b, the user 14 can be returned to 104 to log back into system 10. Returning to the login sequence (104) can help prevent unauthorized use of phone 20.

If user 14 chooses to get the status (130) for buddy list members, system 10, through media server 28, can present user 14 with a listing of members and the status of each member, as indicated at 132. Presence server 26 can establish communications between buddies and can propagate/update their status. The protocol used by presence server 26 (e.g., the SIMPLE protocol) can be such that the UA's, including presence UA's 24, alerting service UA 40, and web presence UA 30*a*, can continuously propagate their presence status to the members of their buddy lists. Such notification requests can be communicated from the "propagator", via presence server 26, to members of the buddy lists of the "propagator". Thus, the UA's for a user can maintain the list and status of the user's buddies. Incoming notification requests from these buddies will update their status on the list.

The form and presentation of the listing can depend on the user equipment and/or the format chosen by the user 14. When the user equipment 20 supports text messaging, the user 14 may choose, at 134, to have a text listing, e.g., a member directory, displayed. The user may scroll through the listing, or search for a particular member, in the manner of known telephone directories. The user may choose, also at 134, to receive a vocal listing of buddy list member status. Using TTS 28*b*, ASR 28*c* and/or DTMF, media server 28 can provide the functionality of a text based phone directory to a user 14 with limited or with no text capabilities.

It can be understood that the user 14 may set the form of presentation of the buddy list as part of the configuration (110) of system 10. Alternatively, system 10 can determine the form of presentation based on the equipment and service profile of the user 14, as may be available from PSTN 12 and/or user database 42. Thus, at 134, the method 100 may default to the predetermined setting and the user 14 may be given the option of changing to an alternate form of presentation, if supported by the user 14 equipment. The rendering of the buddy list can inform the user 14 about the presence status of members of the list and can allow for the selection of a buddy with whom the user wishes to communicate.

Other users can include user 14 in their buddy list and can send instant messages (voice or text) to user 14. For the exemplary embodiment illustrated in FIGS. 1, 2A and 2B, wherein the user 14 equipment is depicted as phone 20, these messages can arrive at user 14 as a telephone call. If supported by user 14 equipment, instant messages can have a distinctive ring tone that the user 14 can recognize as an incoming instant message. User 14 may be unable or unwilling to accept the message, e.g., user 14 may be on the phone. System 10 can persist instant messages in data store 48 until delivery occurs. Alternatively, or in addition, if the user 14 is unable to accept an incoming message, the message can be delivered to voice mail, or a call waiting notification can be given to the user 14. In one embodiment, persisted instant messages can be delivered as a phone call to user 14, once user 14 completes the current call.

The user 14 may choose to receive such undelivered instant messages at 136. If there are no messages, as determined at 136*a*, when user 14 chooses 136 from menu 118, method 100 can provide a textual and/or vocal no message indication (136*b*) to user 14 at 132, in lieu of the buddy list and the user 14 can be returned to menu 118, as indicated at "B". When there are messages, the buddy list can be presented to user 14 in the manner as described previously with relation to getting status 130. The status listing presented at 132 can include message waiting indications associated with the buddy list members. In one embodiment, when user 14 chooses to receive messages at 136, the buddy listing presented can be restricted to those members that have a message waiting indication. Alternatively, the method 100 can present the instant messages to the user in the manner of known voice mail systems, e.g., the system 100 can present the messages to user 14 sequentially.

Using speech recognition and/or DTMF, the user 14 can then select a member with a message waiting indication from the presented listing, at 138, and user 14 can then receive the associated message at 140. The listing presented to user 14 can include a return to menu item that user 14 can choose to return to menu 118, as may be indicated at 142. It can be understood that the method 100 can track the menu choices made, such that intermediate decision or branch points can be transparent to the user 14. For example, other menu 118 choices to be described further herein can include sending a message to (148) and placing a call to (154) the selection at 138. Method 100 can include branch points (e.g., 150 and 158) for these menu choices. Thus, method 100 can navigate from the selection of a member of the buddy list at 138, through these branch points to receiving the message from the member at 140.

For audio messages, the message can be simply played to user 14. For text messages, the message text can be displayed to the user 14 when the equipment of user 14 is capable of such display, or the text can be converted to audio using Text To Speech (TTS) technology. After receiving an instant voice message, user 14 can choose, at 144, to reply to the message, as will be described further below. If the user 14 does not reply, the listing can again be presented to the user 14, such that the user can choose to obtain any additional messages that may be waiting. It can be noted that the listing can be presented without the user choosing text or vocal listings.

In addition, the user 14 can choose (146) to return to the main menu 118 rather than return to the listing. It can be understood that the message waiting indication of the listing can be updated to reflect that the message was delivered. If the listing is restricted to members having a message waiting indication, the entry can be removed from the listing. It can be understood that method 100 can default to menu 118 at branch point 146 when there are no messages remaining.

If the user chooses to send an instant message, either by choosing at 144 to reply via a message, or as selected at 148, the user 14 can record a voice message that can be sent to the originator of the instant voice message in the case of a reply, or to a buddy list member selected from the listing. Alternatively, user 14 can type a text message if the user 14 equipment can support such a capability. The instant message (voice or text) can be persisted by the system 10 until delivery occurs, as previously described. System 10 can also provide for longer retention or logging of messages, as provided in known instant messaging and/or call answering systems.

When user 14 chooses to send a message as selected at 148, the user 14 can be presented a buddy list and can select a member, as shown and described for 134, 132 and 138. As noted previously, intermediate decision or branch points can be transparent to the user 14. In particular, method 100 can branch at 150 to receiving (140) or sending (152) a message depending on whether menu item 136 or 148 was chosen. Once the message is sent, the user 14 can return to the listing to record additional messages for selected members, or can return to 118, via 146, to select another menu item. As described previously with respect to UA's 24 sending and receiving IM messages, the presence UA's 24 can be aware of the sending and receiving of instant messages. Thus, user 14 presence status can typically be busy during these operations. For example, when user 14 chooses menu item 136 or 148, an AIN trigger can signify the change in status, as previously described.

The instant messages that the user 14 can send and/or receive can include an invitation to a telephone call. The invitation can be a prerecorded instant voice message that carries caller information, e.g., instant voice message originator calling information. When user 14 receives an invitation, user 14 can choose, at 144, to accept the invitation and system 10 can create a telephone call between the sender and user 14, as described further below. If user 14 does not wish to create a call, user 14 can reply by sending a message (152), or may choose not to reply to the invitation and return to the listing 132, or menu 118, as chosen at 146.

When the user 14 chooses to make a telephone call while connected to system 10, as at 154, the user 14 can be presented a buddy list and can select a member, as shown and described for 134, 132 and 138. Additionally, or alternatively, the presented list can include access to a phone directory and/or an option that user 14 can select at 138 to input a phone number to be called (156). As known in the art, the directory can be accessible by voice command, such that the user can provide the voice command associated with a directory listing and the listing will be presented to the user. Where the listing is associated with a member of the buddy list, the presence status can be presented in addition to information standard for known directory listings.

When menu item 154 was chosen, system 10 can branch at 158 to initiate a call to the other party (160). Otherwise, system 10 branches at 158 to 150, as previously described with relation to menu items 136 and 148. To initiate a call, system 10 can bridge between the user 14 connection to system 10 and the system 10 connection to the called party to enable the user 14 to connect to the other party, as indicated at 162. When the phone call is in response to an invitation to call, as described above, or when user 14 wishes to respond to an IM message with a phone call, method 100 can transfer, as indicated by branch 144, from receiving a message at 140 to bridging the call between user 14 and the message originator at 162.

The following example is provided using the SIMPLE protocol, though it can be understood that other protocols can be used for the systems and methods described herein. In addition, the example provided can use the call control for a SIMPLE (SIP Proxy) presence server 26. User 14, while connected to system 10, can provide an indication to media server 28, via DTMF or speech, to initiate a call. Media server 28 can send an HTTP request to web server 30, which can translate the request content to an XML-based SIMPLE message and can pass the message to web presence UA 30a of web server 30. Presence UA 24 for user 14 can receive a SIMPLE message about the action via web presence UA 30a.

Presence UA 24 can notify presence (SIMPLE) server 26 to transfer the call to the called party. If transfer succeeds, the result can be a real-time telephone conversation between the user 14 and the called party. The presence status of user 14 can be updated to busy during the call, as at 164. If the called party is a user of a system providing presence information, the presence status of the called party can also be updated to busy to indicate a telephone call has started, e.g., an O_Connect AIN trigger 16 can be generated. Once the call is completed, the user 14 can return to the listing, at 132, to make another call, or can return to 118, via 146, to select another menu item.

In addition to the operations described above, user 14 can receive a telephone call or, when the user 14 is logged in to system 10, can receive calls in the form of messages, alerts and notifications from system 10. Alerting service UA 40 can deliver a diverse set of alerts and notifications to a logged-in user 14. These alerts and notifications can come from public sources, including, but not limited to, web portals and/or voice portals. Additionally, or alternatively, the alerts and notifications can come from private, or user 14 sources, including, but not limited to, electronic calendars, electronic mail inboxes and/or voicemail inboxes.

An incoming communication can be handled by system 10 in the manner of receiving messages (136). As is known in the art, system 10 can provide caller identification information to user 14, such that user 14 can choose whether or not to accept the incoming call. The caller identification information can be presented to user 14 in the manner of presenting the listing at 132. If a call arrives and is accepted by user 14, then user presence can be updated to busy, in a manner similar to that described above for initiating a phone call at 160, 162 and 164. As an example, an O_Connect AIN trigger 16 can be generated and propagated through system 10 to modify presence status on presence UA 24 of user 14.

If the accepted call is an IM message, the user can receive the message, as at 140. After accepting and completing a call, the user can be returned to the menu, as at 146. If user 14 is busy when the call arrives, a call waiting notification, as known in the art, can be given to user 14. If user 14 chooses not to answer the call, then the call may be delivered to voice mail, or in the case of an incoming message, can be queued, as previously described. Incoming messages can also be queued when the user 14 is not logged in to system 10. Alerts and notifications can be treated as incoming instant voice messages. From a user's perspective, the alerts and notifications can be specialized, time or event-driven, and/or possibly urgent messages that the user 14 has indicated a desire to receive.

The systems and methods described herein may not be limited to a particular hardware or software configuration; they may find applicability in many communication environments. For example, the systems and methods described herein in relation to PSTN 12 can provide full participation in the instant voice and text messaging, alerts and notifications, and presence services in a wireless environment and can be an adjunct to Short Message Service (SMS) capabilities provided by cellular phone systems. SMS can be used to send messages of up to 160 characters (224 characters if using a 5-bit mode) to mobile phones, similar to the manner text messages are sent in paging systems. In such an environment, a mobile switching center can provide the functionality of the service switching point and other components described in relation to PSTN 12 can have similar counterparts in a wireless environment.

Thus, it can be understood by those of skill in the art that PSTN 12 provides an exemplary embodiment for the methods and systems described herein and that other communications networks, such as wireless networks, and VoIP networks can be adapted to fully participate in the instant voice and text messaging, alerts and notifications, and status update services described herein and that other devices, such as mobile phones, PDA's and the like for use with such systems can be so adapted.

In addition, the techniques described herein can be implemented in hardware or software, or a combination thereof. The systems and methods can be implemented in one or more computer programs executing on one or more programmable computers, such as may be exemplified by the servers of FIG. 1, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of enabling a user of a communications network to participate in a presence-based network, comprising:
    generating a signal signifying a status of a communications network device of said user;
    transferring said signal to a web server;
    translating said signal to presence-based information for said device;
    forwarding said presence-based information to presence user agents associated with participants of said presence-based network;
    obtaining, at one of said presence user agents associated with said user, presence-based information for selected participants of said presence-based network;
    propagating said presence-based information for said selected participants to a media server of said communications network; and
    communicating said presence-based information for said selected participants to said user in a communications network compatible format.

2. The method of claim 1, wherein communicating said presence-based information for said selected participants comprises:
    initiating a call from said media server to said user when said presence-based information for at least one of said selected participants indicates a status change in a device of said at least one participant; and
    presenting, in said communications network compatible format, said presence-based information for said at least one selected participant to said user when said user accepts said call.

3. The method of claim 1, wherein said communications network is a phone network.

4. The method of claim 3, wherein communicating said presence-based information for said selected participants comprises presenting, in said communications network compatible format, a listing of said selected participants and said corresponding presence-based information for said selected participants when said user selects an option to receive said presence-based information.

5. The method of claim 1, wherein said communications network is a phone network.

6. The method of claim 5, comprising transmitting messages between said user and said selected participants.

7. The method of claim 6, wherein transmitting messages from one of said selected participants to said user comprises:
    forwarding said message to said media server;
    translating said message to a communications network compatible message;
    initiating a call to said user;
    presenting said communications network compatible message to said user when said user accepts said call; and
    queuing said communications network compatible message when said user does not accept said call.

8. The method of claim 7, comprising:
    presenting a listing of said selected participants to said user when said user selects an option to receive queued messages, said listing including a queued message indication for said selected participants having messages not delivered to said user; and
    presenting selected queued messages to said user.

9. The method of claim 7, comprising presenting said queued messages sequentially to said user when said user selects an option to receive queued messages.

10. The method of claim 6, wherein transmitting messages from said user to said selected participants comprises:
    communicating a communications network compatible message from said user to said media server;
    translating said communications network compatible message to a web-based request referencing said communications network compatible message;
    creating a presence-based network message from said web-based request; and
    sending said presence-based network message to presence user agents associated with said selected participants.

11. The method of claim 10, wherein said communications network compatible message is an audio message and said presence-based network message identifies a web site for playing said audio message.

12. The method of claim 1, wherein communicating said presence-based information for said selected participants to said user in said communications network compatible format comprises applying a text-to-speech translation to said presence-based information.

13. The method of claim 1, wherein said communications network is a phone network.

14. The method of claim 13, comprising:
    accepting a login sequence from said user to connect said user to said presence-based network; and
    generating a signal signifying an on-line status for said user's device.

15. The method of claim 14, comprising:
    generating a signal signifying a busy status for said user's device when said user initiates at least one action chosen from a number of actions including getting status, receiving messages, sending messages, making a call on said communications network and receiving a call on said communications network;

generating a signal signifying an off-line status for said user's device when said user performs a logout; and
generating, when a predetermined amount of time elapses after said user performs a hang-up, a signal signifying a status for said user's device chosen by said user from a listing including an away status and an off-line status.

16. The method of claim 1, wherein generating a signal comprises:
sending a trigger from a service switching point of said communications network to a service control point of said communications network, said trigger based on a user action with respect to said user's device; and
generating at least one of a hypertext transfer protocol request and a transmission capabilities application part message.

17. The method of claim 16, wherein propagating said presence-based information to said presence user agents comprises:
propagating said presence-based information to said presence user agent associated with said user;
modifying a presence status of said presence user agent associated with said user;
communicating said modified presence status to a presence server; and
propagating said modified status from said presence server to said presence user agents associated with participants of said presence-based network.

18. A system for providing communications network participation in a presence-based network, comprising:
a service control point receiving status triggers for participant devices connected to said communications network;
a web server receiving trigger signals from said service control point, said web server translating said trigger signals to presence-based information for respective participant devices connected to said communications network;
presence user agents, each presence user agent associated with a participant in said presence-based network, each presence user agent receiving said presence-based information for a respective participant device and each presence user agent modifying its presence status to correspond with said received presence-based information;
a presence server receiving notifications of modified presence statuses for said respective participant devices and propagating said notifications to presence user agents of buddy list participants for said respective participant devices so as to communicate said notifications to said buddy lists participants; and
a media server receiving said notifications for buddy list participants having participant devices connected to said communications network and communicating said notifications through said participant devices connected to said communications network.

19. The system of claim 18, wherein said media server comprises:
a speech recognition module; and
a text to speech module, said speech recognition module and text to speech module facilitating communication of instant messages between buddy list participants.

20. The system of claim 19, comprising a persisted message database for storing instant messages when communication of said instant messages is not completed.

21. The system of claim 18, comprising a media server user agent to facilitate communications between said presence server and said media server.

22. The system of claim 18, comprising a notification engine receiving notifications and alerts from sources outside said presence-based network and propagating said notifications and alerts through said presence-based network via communication with said web server.

23. The system of claim 22, comprising an alerting service user agent to facilitate communication between said notification engine and said presence user agents.

24. The system of claim 18 comprising:
at least one database containing participant information; and
an application server to facilitate communication between said web server and said at least one database.

25. The system of claim 24, wherein said application server comprises a trigger processor to facilitate communication between said service control point and said web server when said trigger signal is a transmission control protocol/internet protocol transmission capabilities application part message.

26. The system of claim 18, wherein said media server comprises:
a speech recognition module;
a text to speech module, said speech recognition module and text to speech module facilitating communication of instant messages between buddy list participants; and
a media server user agent to facilitate communications between said presence server and said media server.

27. The system of claim 26, comprising a persisted message database for storing instant messages when communication of said instant messages is not completed.

28. The system of claim 26, comprising a notification engine receiving notifications and alerts from sources outside said presence-based network and propagating said notifications and alerts through said presence-based network via communication with said web server.

29. The system of claim 28, comprising an alerting service user agent to facilitate communication between said notification engine and said presence user agents.

30. The system of claim 28 comprising:
at least one database containing participant information; and
an application server to facilitate communication between said web server and said at least one database.

31. The system of claim 30, wherein said application server comprises a trigger processor to facilitate communication between said service control point and said web server when said status signal is a transmission control protocol/internet protocol transmission capabilities application part message.

32. The system of claim 31, comprising an alerting service user agent to facilitate communication between said notification engine and said presence user agents.

33. The method of claim 18, wherein said communications network is a phone network.

34. A computer readable medium encoded with a computer program, for enabling a user of a communications network to participate in a presence-based network, said computer program including instructions for causing a processor to:
generate a signal signifying a status of a communications network device of said user;
transfer said signal to a web server;
translate said signal to presence-based information for said device;

propagate said presence-based information to presence user agents associated with participants of said presence-based network;

obtain, at one of said presence user agents associated with said user, presence-based information for selected participants of said presence-based network;

forward said presence-based information for said selected participants to a media server of said communications network; and communicate said presence-based information for said selected participants to said user in a communications network compatible format.

35. The computer readable medium of claim 34, wherein said communications network is a phone network.

36. The computer readable medium of claim 35, wherein said instructions for causing a processor to communicate said presence-based information for said selected participants include instructions for causing a processor to present, in said communications network compatible format, a listing of said selected participants and said corresponding presence-based information for said selected participants when said user selects an option to receive said presence-based information.

37. The computer readable medium of claim 36, wherein said instructions for causing a processor to communicate said presence-based information for said selected participants include instructions for causing a processor to initiate a call from said media server to said user and await answering said call by said user to present said listing.

38. The computer readable medium of claim 34, comprising instructions for causing a processor to transmit messages from one of said selected participants to said user by:

forwarding said message to said media server;

translating said message to a communications network compatible message;

initiating a call to said user;

presenting said communications network compatible message to said user when said user accepts said call; and queuing said communications network compatible message when said user does not accept said call.

39. The computer readable medium of claim 38, wherein said instructions for causing a processor to communicate said presence-based information for said selected participants include instructions for causing a processor to:

present a listing of said selected participants to said user when said user selects an option to receive queued messages, said listing including a queued message indication for said selected participants having messages not delivered to said user; and present selected queued messages to said user.

40. The computer readable medium of claim 38, comprising instructions for causing a processor to present said queued messages sequentially to said user when said user selects an option to receive queued messages.

41. The computer readable medium of claim 38, wherein said instructions for causing a processor to transmit messages include instructions for causing a processor to:

communicate a communications network compatible message from said user to said media server;

translate said communications network compatible message to a web-based request referencing said communications network compatible message;

create a presence-based network message from said web-based request; and send said presence-based network message to presence user agents associated with said selected participants.

42. The computer readable medium of claim 41, wherein said instructions for causing a processor to create a presence-based network message include instructions for causing a processor to identify a web site for playing said communications network compatible message, wherein said communications network compatible message is an audio message.

43. The computer readable medium of claim 34, wherein said instructions include instructions for causing a processor to apply a text-to-speech translation to said presence-based information.

44. The computer readable medium of claim 34, wherein said instructions include instructions for causing a processor to:

provide to said user a choice of actions including getting status, receiving messages, sending messages, making a call on said communications network and receiving a call on said communications network;

generate a signal signifying a busy status for said user's device when said user initiates at least one action of said choice of actions;

generate a signal signifying an off-line status for said user's device when said user performs a logout from said computer program; and generate, when a predetermined amount of time elapses after said user performs a hang-up, a signal signifying a status for said user's device chosen by said user from a listing including an away status and an off-line status.

45. The computer readable medium of claim 34, wherein said instructions to generate a signal include instructions for causing a processor to:

send a trigger from a service switching point of said communications network to a service control point of said communications network, said trigger based on a user action with respect to said user's device; and generate at least one of a hypertext transfer protocol request and a transmission capabilities application part message.

46. The computer readable medium of claim 45, wherein said instructions for controlling a computer to propagate said presence-based information to said presence user agents include instructions for controlling a computer to:

propagate said presence-based information to said presence user agent associated with said user;

modify a presence status of said presence user agent associated with said user;

communicate said modified presence status to a presence server; and propagate said modified status from said presence server to said presence user agents associated with participants of said presence-based network.

* * * * *